(12) United States Patent
Zhang et al.

(10) Patent No.: US 12,257,876 B2
(45) Date of Patent: Mar. 25, 2025

(54) THERMAL MANAGEMENT SYSTEM, THERMAL MANAGEMENT METHOD AND ELECTRICAL DEVICE

(71) Applicant: CONTEMPORARY AMPEREX TECHNOLOGY (HONG KONG) LIMITED, Hong Kong (CN)

(72) Inventors: Chuanhui Zhang, Fujian (CN); Bao Li, Fujian (CN); Kai Wu, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 106 days.

(21) Appl. No.: 17/888,506

(22) Filed: Aug. 16, 2022

(65) Prior Publication Data

US 2023/0191868 A1 Jun. 22, 2023

Related U.S. Application Data

(63) Continuation of application No. PCT/CN2021/139758, filed on Dec. 20, 2021.

(51) Int. Cl.
  *B60H 1/32* (2006.01)
  *B60H 1/00* (2006.01)
  (Continued)

(52) U.S. Cl.
  CPC ..... *B60H 1/00278* (2013.01); *B60H 1/00885* (2013.01); *B60H 1/3205* (2013.01);
  (Continued)

(58) Field of Classification Search
  CPC .......... H01M 10/6569; H01M 10/615; H01M 10/617; H01M 10/625; H01M 10/663;
  (Continued)

(56) References Cited

U.S. PATENT DOCUMENTS 9,680,190 B1 6/2017 Xia
2005/0167169 A1 8/2005 Gering et al.
(Continued)

FOREIGN PATENT DOCUMENTS

CN 102290618 A * 12/2011
CN 105539067 A 5/2016
(Continued)

OTHER PUBLICATIONS

Extended European Search Report issued Nov. 24, 2023 in European Patent Application No. 21912331.2.
(Continued)

*Primary Examiner* — Frantz F Jules
*Assistant Examiner* — Martha Tadesse
(74) *Attorney, Agent, or Firm* — XSENSUS LLP (57) ABSTRACT

The embodiments of this application relate to the technical field of battery, and in particular, to a thermal management system, a method and an equipment. In this thermal management system, a compressor and a condenser form a cooling loop with a thermal exchange pipeline of the battery, and a compressor and an evaporator form a heating loop with a thermal exchange pipeline, so that this thermal management system can provide both cooling and heating for battery, in comparison with the direct cooling system and heating film, this thermal management system features simple structure and high reliability. In addition, the locations of the condenser and the evaporator can be reasonably arranged as required to achieve the secondary utilization of hot air and cold air.

13 Claims, 5 Drawing Sheets

(51) Int. Cl.
  *H01M 10/613* (2014.01)
  *H01M 10/6564* (2014.01)

(52) U.S. Cl.
  CPC ..... *H01M 10/613* (2015.04); *H01M 10/6564* (2015.04); *B60H 2001/00307* (2013.01); *B60H 2001/00928* (2013.01)

(58) Field of Classification Search
  CPC .... H01M 10/613; F25B 5/04; B60H 1/00899; B60H 1/00885
  See application file for complete search history.

(56) References Cited

U.S. PATENT DOCUMENTS

| | | | |
|---|---|---|---|
| 2008/0078542 A1 | 4/2008 | Gering et al. | |
| 2012/0240604 A1* | 9/2012 | Choi | B60H 1/00921 165/41 |
| 2017/0350624 A1 | 12/2017 | Kawakubo | |
| 2018/0319246 A1 | 11/2018 | Allgaeuer et al. | |
| 2020/0047583 A1 | 2/2020 | Ishizeki et al. | |
| 2022/0134842 A1 | 5/2022 | Ishizeki et al. | |

FOREIGN PATENT DOCUMENTS

| | | |
|---|---|---|
| CN | 205752446 U | 11/2016 |
| CN | 107351619 A | 11/2017 |
| CN | 206669946 U | 11/2017 |
| CN | 108312866 A | 7/2018 |
| DE | 11 2018 002250 T5 | 1/2020 |
| JP | 2014-037178 A | 2/2014 |
| JP | 2015-186989 A | 10/2015 |
| JP | 2019-016584 A | 1/2019 |
| JP | 2019-050720 A | 3/2019 |
| JP | 2020-147161 A | 9/2020 |
| JP | 2021-150105 A | 9/2021 |

OTHER PUBLICATIONS

Office Action issued Mar. 4, 2024 in Japanese Patent Application No. 2022-535188 with computer-generated English translation thereof.
International Search Report issued Jul. 27, 2022 in International Application No. PCT/CN2021/139758, 8 pages.
Written Opinion of the International Searching Authority issued Jul. 27, 2022 in International Application No. PCT/CN2021/139758, 9 pages.
Decision to Grant a Patent issued Oct. 7, 2024 in Japanese Patent Application No. 2022-535188 with English translation thereof.

* cited by examiner

THERMAL MANAGEMENT SYSTEM, THERMAL MANAGEMENT METHOD AND ELECTRICAL DEVICE

CROSS-REFERENCE TO RELATED APPLICATIONS

This present application is a continuation of International Application No. PCT/CN2021/139758, filed Dec. 20, 2021, the entire contents of which is incorporated herein by reference in its entirety.

TECHNICAL FIELD

The embodiments of this application relate to the technical field of battery, and in particular, to a thermal management system and method and an electrical device.

BACKGROUND

At present, the performance of battery is greatly affected by the climate environment, which will be affected by either too high or too low ambient temperature, so the battery temperature is required to be regulated to maintain within a certain range. In regions with hot climates, a battery cooling system is required to lower the temperature of the battery when the temperature is too high. In regions with cold climates, a battery heating system is required to increase the temperature of the battery when the temperature is too low.

To adapt the battery to the environment and maximize the performance and life of the battery, thermal management is required to control the operating temperature environment of the battery.

SUMMARY

In consideration of the above, this application provides a thermal management system and method and an equipment, which can provide a cooling function and a heating function for battery, with simple structure and high reliability.

According to a first aspect, this application provides a thermal management system comprising a compressor, a condenser and an evaporator. The compressor and the condenser form a cooling loop with a thermal exchange pipeline of the battery, and the compressor and the evaporator form a heating loop with the thermal exchange pipeline.

In the above implementation of this application, the compressor and the condenser form a cooling loop with the thermal exchange pipeline of the battery, and the compressor and the evaporator form a heating loop with the thermal exchange pipeline, so that this thermal management system can provide both cooling and heating for battery, in comparison with the direct cooling system and heating film, this thermal management system features simple structure and high reliability. In addition, the location of the condenser and the evaporator can be reasonably arranged as required to achieve the secondary utilization of hot air and cold air.

In a possible implementation of the first aspect, the thermal management system further comprises a first stop valve, a second stop valve and a control device, and the control device is communicated with the first stop valve and the second stop valve, respectively. The air outlet of the compressor is communicated with the first end of the condenser, the second end of the condenser is communicated with the first end of the thermal exchange pipeline, and the air inlet of the compressor is communicated with the second end of the thermal exchange pipeline through the first stop valve, forming a cooling loop. The air outlet of the compressor is communicated with the first end of the thermal exchange pipeline through the second stop valve, the first end of the evaporator is communicated with the second end of the thermal exchange pipeline, and the second end of the evaporator is communicated with the air inlet of the compressor, forming a heating loop. The control device is used to control the opening of the first stop valve and the closing of the second stop valve to conduct the cooling loop, alternatively, to control the closing of the first stop valve and the opening of the second stop valve to conduct the heating loop.

In the above implementation of this application, based on the structure of said cooling loop and heating loop, the control device may select to conduct the cooling loop or the heating loop by opening the first stop valve or the second stop valve accordingly. When the cooling loop is conducted, the compressor and the condenser are operating to provide cooling for the battery. When the heating loop is conducted, the compressor and the evaporator are operating to provide heating for the battery. That is, the thermal management system can provide both a cooling function and a heating function, and the thermal management system features simple structure and easy control, which can improve the reliability.

In a possible implementation of the first aspect, the thermal management system further comprises an energy accumulator, and the energy accumulator is used to store coolants.

In the above implementation of this application, the arrangement of the energy accumulator can store sufficient coolants on the one hand, and on the other hand, this arrangement can further buffer the pressure to prevent the pipeline of the thermal management system from breaking due to excessive pressure.

In a possible implementation of the first aspect, the air inlet of an energy accumulator is communicated with the second end of an evaporator, the air inlet of the energy accumulator is communicated with the second end of a thermal exchange pipeline through a first stop valve, and the air outlet of the energy accumulator is communicated with the air outlet of a compressor.

In the above implementation of this application, the energy accumulator is arranged in said manner, so that the energy accumulator can be located either in the cooling loop or the heating loop, that is, whether the thermal management system is operating under cooling mode or heating mode, the energy accumulator can provide coolants and buffer the pressure, in addition, said arrangement has a simple structure.

In a possible implementation of the first aspect, the thermal management system further comprises a first expansion valve. The first end of the first expansion valve is communicated with the second end of a condenser, and the second end of the first expansion valve is communicated with the first end of a thermal exchange pipeline. The first expansion valve is communicated with a control device, and the control device is further used to control the connection of the first expansion valve when conducting the cooling loop.

In the above implementation of this application, the first expansion valve is arranged between the condenser and the thermal exchange pipeline, so that the coolants entering the thermal exchange pipeline is in a vapor state, facilitating the full evaporation of coolants in the thermal exchange pipeline after absorbing the heat, with a high thermal exchange efficiency, in addition, this arrangement further can control the flow of coolants entering the thermal exchange pipeline, so a negative impact will not occur due to excessive or insufficient flow of coolants.

In a possible implementation of the first aspect, the thermal management system further comprises a second expansion valve. The first end of the second expansion valve is communicated with the first end of an evaporator, and the second end of the second expansion valve is communicated with the second end of a thermal exchange pipeline. The second expansion valve is connected with a control device, and the control device is further used to control the connection of the second expansion valve when conducting the heating loop.

In the above implementation of this application, the second expansion valve is arranged between the evaporator and the thermal exchange pipeline, so that the coolants entering the evaporator is in a vapor state, facilitating the full evaporation of coolants in the evaporator after absorbing the heat, with a high evaporation efficiency, in addition, this arrangement further can control the flow of coolants entering the evaporator, so an incomplete evaporation will not occur due to excessive flow of coolants.

In a possible implementation of the first aspect, the thermal management system further comprises a third stop valve, and the third stop valve is arranged on a pipeline between the air outlet of a compressor and the first end of a condenser. The third stop valve is communicated with a control device, and the control device is further used to control the opening of the third stop valve when conducting the cooling loop, alternatively, to control the closing of the third stop valve when conducting the heating loop.

In the above implementation of this application, the third stop valve is arranged on the pipeline between the air outlet of the compressor and the first end of the condenser. When the conduct of heating loop is required, the control device will control the closing of the third stop valve, avoiding coolants entering the condenser under heating mode, that is, under the stopping by the third stop valve, the gaseous coolants will fully enter the thermal exchange pipeline through the second stop valve, with a high heating efficiency.

In a possible implementation of the first aspect, the thermal management system further comprises a radiator, and the radiator is used to dissipate heat for a condenser. The radiator is communicated with a control device, and the control device is further used to control the starting of the radiator when conducting the cooling loop, alternatively, to control the stop of the radiator when conducting the heating loop.

In the above implementation of this application, the heat accumulation around the condenser can be effectively avoided by arranging the radiator to dissipate heat for the condenser, so that the condenser can achieve a better condensation effect, thus improving the cooling effect of the thermal management system.

According to a second aspect, this application provides a control method for the thermal management system, and the thermal management system comprises a compressor, a condenser and an evaporator. The compressor and the condenser form a cooling loop with a thermal exchange pipeline of the battery, and the compressor and the evaporator form a heating loop with the thermal exchange pipeline.

The preceding method comprises: acquiring a current temperature of the battery, controlling the starting of the compressor and the condenser when the current temperature is greater than or equal to the first temperature threshold, and controlling the conduct of the cooling loop; controlling the starting of the compressor and the evaporator when the current temperature is less than or equal to the second temperature threshold, and controlling the conduct of the heating loop. The first temperature threshold is greater than the second temperature threshold.

In the above implementation of this application, it is possible to provide the battery with the cooling function and the heating function. In addition, the corresponding air outlets of the condenser and evaporator can be reasonably controlled as required to achieve the secondary utilization of hot air and cold air.

In a possible implementation of the second aspect, the thermal management system further comprises a first stop valve and a second stop valve. The air outlet of a compressor is communicated with the first end of a condenser, the second end of the condenser is communicated with the first end of a thermal exchange pipeline, and the air inlet of the compressor is communicated with the second end of the thermal exchange pipeline through the first stop valve, forming a cooling loop. The air outlet of the compressor is communicated with the first end of the thermal exchange pipeline through the second stop valve, the first end of an evaporator is communicated with the second end of the thermal exchange pipeline, and the second end of the evaporator is communicated with the air inlet of the compressor, forming a heating loop.

The preceding "controlling the conduct of the cooling loop" comprises:

controlling the opening of the first stop valve and the closing of the second stop valve to conduct the cooling loop.

The preceding "controlling the conduct of the heating loop" comprises: controlling the closing of the first stop valve and the opening of the second stop valve to conduct the heating loop.

In the above implementation of this application, the cooling loop can be conducted by controlling the opening of the first stop valve and the closing of the second stop valve, and the heating loop can be conducted by controlling the closing of the first stop valve and the opening of the second stop valve. The control is simple, so the reliability can be improved.

In a possible implementation of the second aspect, the thermal management system further comprises a first expansion valve. The first end of the first expansion valve is communicated with the second end of a condenser, and the second end of the first expansion valve is communicated with the first end of a thermal exchange pipeline.

The preceding "controlling the conduct of the cooling loop" further comprises: controlling the connection of the first expansion valve.

In the above implementation of this application, the first expansion valve is controlled to be opened during the cooling, so that the coolants entering the thermal exchange pipeline is in a vapor state, facilitating the full evaporation of coolants in the thermal exchange pipeline after absorbing the heat, with a high thermal exchange efficiency, in addition, this arrangement further can control the flow of coolants entering the thermal exchange pipeline, so a negative impact will not occur due to excessive or insufficient flow of coolants.

In a possible implementation of the second aspect, the thermal management system further comprises a second expansion valve. The first end of the second expansion valve is communicated with the first end of an evaporator, and the second end of the second expansion valve is communicated with the second end of a thermal exchange pipeline.

The preceding "controlling the conduct of the heating loop" further comprises: controlling the connection of the second expansion valve.

In the above implementation of this application, the second expansion valve is controlled to be opened during the heating, so that the coolants entering the evaporator is in a vapor state, facilitating the full evaporation of coolants in the evaporator after absorbing the heat, with a high evaporation efficiency, in addition, this arrangement further can control the flow of coolants entering the evaporator, so an incomplete evaporation will not occur due to excessive flow of coolants.

In a possible implementation of the second aspect, the thermal management system further comprises a third stop valve, and the third stop valve is arranged on the pipeline between the air outlet of a compressor and the first end of a condenser.

The preceding "controlling the conduct of the cooling loop" further comprises: controlling the opening of the third stop valve.

In the above implementation of this application, when the conduct of the cooling loop is required, the third stop valve is controlled to be opened, so that the gaseous coolants can enter the condenser. When the conduct of the heating loop is required, the third stop valve is controlled to be closed to avoid the heating effect being affected by the coolants entering the condenser under heating mode. In addition, under the stopping by the third stop valve, the gaseous coolants will fully enter the thermal exchange pipeline through the second stop valve, with a high heating efficiency.

In a possible implementation of the second aspect, the thermal management system further comprises a radiator, and the radiator is used to dissipate heat for the condenser.

The preceding method further comprises: controlling the radiator to start operation when the current temperature is greater than or equal to the first temperature threshold.

In the above implementation of this application, the heat accumulation ID around the condenser can be effectively avoided by controlling the radiator to start operation for the heat dissipation of the condenser, so that the condenser can achieve a better condensation effect, thus improving the cooling effect of the thermal management system.

According to a third aspect, this application provides an electrical device, comprising a thermal management system and a battery according to the first aspect.

In the above implementation of this application, the thermal management system can provide a cooling function and a heating function for the battery, with simple structure and high reliability, facilitating the normal operation of electrical device in high or low temperature environment.

The above description is simply an overview of the technical solutions of this application. To understand the technical means of this application more clearly so that this application can be implemented in accordance with the contents of the manual, and to present the above and other purposes, features and advantages of this application more evidently and understandably, the specific implementations of this application are given below.

BRIEF DESCRIPTION OF DRAWINGS

After reading the detailed description of optimal implementations below, various other advantages and benefits will become clear to a person of ordinary skill in the art. The drawings are simply intended for the purpose of showing the optimal implementations, and are not considered to be a limitation on this application. In addition, the same drawing reference numeral in all drawings means the same component. In the drawings.

DETAILED DESCRIPTION OF EMBODIMENTS

The following gives a more detailed description of implementations under the technical solutions of this application with reference to drawings. The following embodiments are simply intended to describe the technical solutions of this application more clearly, and are therefore used only as examples but are not intended to limit the scope of this application.

Unless otherwise defined, all technical and scientific terms used herein have the same meaning as those normally understood by a person of skill in the art of this application. The terms used herein are for the purpose of describing specific embodiments and are not intended to limit this application. The terms "comprise" and "have" and any variations thereof in the description, Claims and said drawings of this application are intended to cover a non-exclusive inclusion.

In the description of the embodiments of this application, the technical terms such as "first" and "second" are simply used to distinguish different objects, and can neither be understood as indicating or implying relative importance, nor implying the quantity, specific order or primary & secondary relationship of the indicated technical features. In the description of the embodiments of this application, "multiple" means two or more, unless otherwise expressly and specifically defined.

The "embodiment" referred to herein means at least one embodiment that can be included in this application with reference to the specific characteristics, structures or features described in the embodiment. The phrase at various positions in the description neither does necessarily refer to the same embodiment, nor are they independent or alternative embodiments mutually exclusive with other embodiments.

It is understood explicitly and implicitly by a person of skill in the art that the embodiments described herein can be combined with other embodiments.

In the description of the embodiments of this application, the term "and/or" simply describes the association relation of the associated objects, indicating that there can be three relations, such as A and/or B, indicating that A exists alone, A and B exist simultaneously, and B exists alone. In addition, the character "/" herein generally indicates a "or" relation between associated objects.

In the description of embodiments of this application, the term "multiple" means more than two (including two), similarly, "multiple groups" means more than two groups (including two groups), and "multiple pieces" means more than two pieces (including two pieces).

With the development of green energy, the application of battery is increasingly extensive, especially in the field of emerging new energy vehicles, information appliances or photovoltaic power generation in recent years, and battery is used as an important energy storage or power supply equipment, such as power supply for new energy vehicles or terminal equipment, and energy storage for solar panels. With the continuous expansion of battery applications, its market demand is also constantly expanding.

The applicant of this application notes that the charging and discharging efficiency of a battery is related to its operating temperature, and either too high or too low temperature will have a great impact on its performance and endurance capacity. Specifically, in an environment of low temperature, the battery will appear larger internal resistance and smaller capacity, and in extreme cases, the electrolyte will be frozen or the battery can't discharge, resulting in a weakened endurance capacity. When handled improperly, it will lead to instantaneous voltage overcharge, resulting in internal short circuit to bring the risk of burning and explosion. In an environment of high temperature, the charging and discharging efficiency of battery is low, affecting the power of the battery, and in serious cases, a thermal runaway will occur, affecting the safety and service life of battery. Understandably, in addition to being affected by high ambient temperature, the battery will generate a large amount of heat in the discharging process, and the heat will accumulate in a relatively narrow space over time, as a result, the difficulty in dissipating heat will reduce the discharging efficiency of battery, resulting in the risk of a thermal runaway.

Therefore, a thermal management system is required to manage the temperature of the battery so that it can operate within a safe temperature range, which will neither be affected by the ambient temperature nor by the heat release of the battery.

At present, most thermal management systems only comprise a cooling system, and the cooling system mainly includes three categories: air cooling system, liquid cooling system and direct cooling system. In an air cooling system, the natural air or cooling air flowing through the surface of the battery is used to achieve the effect of thermal exchange and cooling. The heat taken away by air is limited, so the thermal exchange efficiency is low, and the temperature uniformity inside the battery is poor, as a result, it is difficult to achieve more accurate control on the battery temperature. In a liquid cooling system, the anti-freezing solution (such as ethylene glycol) is used as the thermal exchange medium to flow through the thermal exchange loop for cooling and absorbing heat for the battery. In a direct cooling system, the coolants (refrigerants, phase-change material) are used as thermal exchange medium, and in comparison with liquid cooling system, the coolants can absorb a lot of heat in the process of gas-liquid phase-change, which can take away the heat inside the battery more quickly, with a high thermal exchange efficiency.

However, only cooling mode is available in the direct cooling system, without heating mode, so the combination with heating film is required to achieve battery heating. As a heating element with constant resistance, the heating film usually comprises a resistance wire, an insulation cladding and a lead wire. The resistance wire is generally made of nickel-chromium alloy or iron-chromium alloy, and the insulation cladding is generally made of polyimide (PI film), silica gel or epoxy resin. The heating film is attached to the shell of the cell module, and multiple heating films in series or parallel are powered by the battery. After the heating film is energized, the resistance is heated to provide heat for the battery. On the one hand, the heating film has complex circuit, low reliability and low heating efficiency, and on the other hand, the heating film takes up more space inside the battery, affecting the energy density of the battery.

Based on the above considerations and the research findings, the applicant of this application designs a thermal management system that can provide a cooling function or a heating function for battery through reasonable pipeline design and in combination with the phase changes (such as liquid to gas, or gas to liquid) of coolants. That is, when the battery temperature is too high, the thermal management system will absorb the heat inside the battery to cool the battery under a cooling mode; when the battery temperature is too low, the thermal management system will provide heat for the inside of battery to heat the battery under a heating mode.

Specifically, the heat management system comprises a compressor, a condenser and an evaporator, wherein the compressor and condenser form a cooling loop with a thermal exchange pipeline of the battery, and the compressor and evaporator form a heating loop with the thermal exchange pipeline of the battery. That is, only one thermal exchange pipeline is required in the battery. For example, an S-shaped or Z-shaped capillary pipeline can be laid on the inside of the bottom or the side wall of the battery shell to form a thermal exchange pipeline. The thermal management system can be arranged in the operating environment of the battery. For example, when the battery supplies power to an electric vehicle, the thermal management system can be arranged on the electric vehicle, that is, the compressor, the condenser, and the evaporator are arranged on the electric vehicle.

Understandably, a "cooling channel" is arranged between a compressor & a condenser and a thermal exchange pipeline to transmit and store the coolants such as freon), that is, in a cooling loop, the low-temperature & low-pressure gaseous coolants are compressed by the compressor into high-temperature & high pressure gaseous coolants, which turn into liquid coolants after cooling and heat dissipation by the condenser, and the liquid coolants will flow into the thermal exchange pipeline of the battery to absorb heat inside the battery, then the liquid coolants are evaporated into gaseous coolants, which can be compressed again by the compressor. Thus, the coolants are recycled in the cooling loop through the gas-liquid change. When passing through the thermal exchange pipeline, the coolants absorb the heat inside the battery to achieve the effect of cooling the battery, and the thermal exchange pipeline is equivalent to an evaporator at this moment.

A "heating channel" is arranged between a compressor & an evaporator and a thermal exchange pipeline to transmit and store the coolants, that is, in a heating loop, the low-temperature & low-pressure gaseous coolants are compressed by the compressor into high-temperature & high pressure gaseous coolants, which turn into liquid coolants after entering the thermal exchange pipeline to dissipate heat. The liquid coolants will enter the evaporator for evaporation and turn into gaseous coolants, which can be compressed again by the compressor. Thus, the coolants are recycled in the cooling loop through the gas-liquid change. When passing through the thermal exchange pipeline, the coolants dissipate heat to achieve the effect of heating the battery, and the thermal exchange pipeline is equivalent to a condenser at this moment.

Understandably, the heating loop and the cooling loop share a compressor and a thermal exchange pipeline, and the heating loop and the cooling loop also share the same coolants. By controlling the conduct of the cooling loop or the heating loop, the coolants change phase when passing through a thermal exchange pipeline, providing a cooling function or a heating function.

That is, this thermal management system can provide a cooling function and a heating function for the battery, and in comparison with the above direct cooling system and heating film form, this thermal management system features simple structure and high reliability.

The thermal management system and the battery disclosed in the embodiment of this application can, but are not limited to, be used in electrical device such as vehicles, ships or aircraft. Thus, the thermal management system can provide a cooling function and a heating function for the battery, with simple structure and high reliability, facilitating the normal operation of electrical device in either high or low temperature environment.

Figure 1:
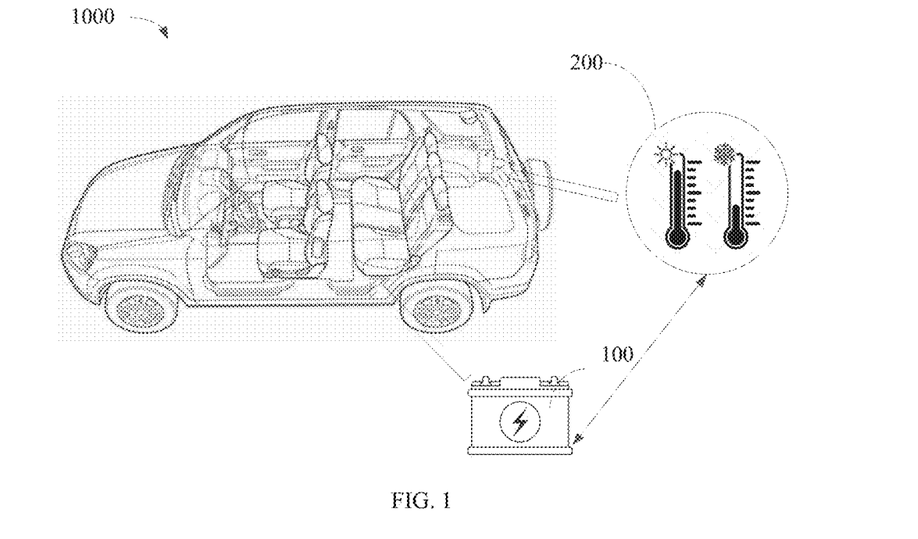
FIG. 1 is a structural schematic diagram of an electric vehicle in some embodiments of this application.

The embodiment of this application provides an electrical device, and the electrical device can, but is not limited to, be vehicles, ships or aircraft. For convenience, one embodiment of this application, where an electric vehicle is used as the electrical device, is taken as an example to describe the following embodiments. As shown in FIG. 1, a battery 100 and a thermal management system 200 are arranged inside an electric vehicle 1000, and the thermal management system 200 is communicated the thermal exchange pipeline of the battery 100.

The battery 100 can be arranged at the bottom, head or tail of the electric vehicle 1000. The battery 100 can be used as the driving power of the electric vehicle 1000, replacing or partially replacing fuel oil or natural gas to provide driving power for the electric vehicle 1000.

Figure 2:
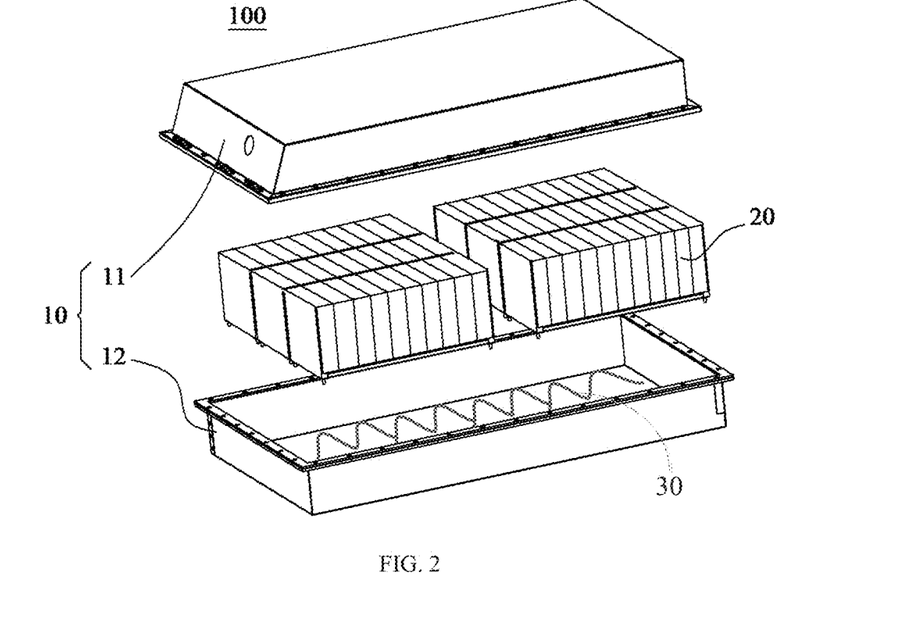
FIG. 2 is a structural schematic diagram of a battery in some embodiments of this application.

Please refer to FIG. 2, which is an exploded view of the battery 100 provided in some embodiments of this application. The battery 100 comprises a box 10 and a battery cell 20, and the battery cell 20 is housed in the box 10. The box 10 provides space for the battery cell 20, and multiple structures can be adopted for the box 10. In some embodiments, the box 10 comprises a first part 11 and a second part 12. The first part 11 and the second part 12 cover each other, and the first part 11 and the second part 12 jointly define the space to accommodate the battery cell 20. The second part 12 can be a hollow structure with an opening at one end, and the first part 11 can be a plate-shaped structure. The first part 11 covers at the opening side of the second part 12, so that the first part 11 and the second part 12 jointly define the accommodation space. Alternatively, the first part 11 and the second part 12 may also both be hollow structures with openings on one side, and the opening side of the first part 11 covers at the opening side of the second part 12. Alternatively, the box 10 formed by the first part 11 and the second part 12 can be in multiple shapes, such as cylinder and cuboid.

In the battery 100, the battery cell 20 can be multiple, and the multiple battery cells 20 can be in series, parallel or parallel-series. A parallel-series connection refers to that there is both series connection and parallel connection in multiple battery cells 20. The multiple battery cells 20 can be directly connected in series, parallel or parallel-series, and then a whole comprising multiple battery cells 20 is housed in the box 10. Alternatively, the battery 100 can also be a battery module comprising multiple battery cells 20 in series, parallel, or parallel-series connection, and the multiple battery modules are then connected in series, parallel, or parallel-series to term a whole, which is housed in the box 10. The battery 100 can further comprise other structures. For example, the battery 100 can further comprise a convergence component for achieving electric connections between the multiple battery cells 20. The battery 100 can further comprise a wire harness isolation board assembly for achieving the series and parallel connection of battery cells as well as the installation & fixation of sampling lines.

Each battery cell 20 can be a secondary battery or a primary battery, and each battery cell 20 can, but is not limited to, be a lithium-sulfur battery, a sodium-ion battery or a magnesium-ion battery. The battery cell 20 can be in a cylinder, flat, rectangular, or other shapes.

The battery 100 further comprises a thermal exchange pipeline 30, and the thermal exchange pipeline 30 is arranged inside the box 10, for example, it can be arranged on the top of the first part 11 or at the bottom of the second part 12, alternatively, it can also be arranged on the side of the first part 11 and/or the second part 12. In FIG. 2, the thermal exchange pipeline 30 is arranged at the bottom of the second part 12 as an exemplary description. There is no restriction on the location of the thermal exchange pipeline inside the battery.

Figure 3:
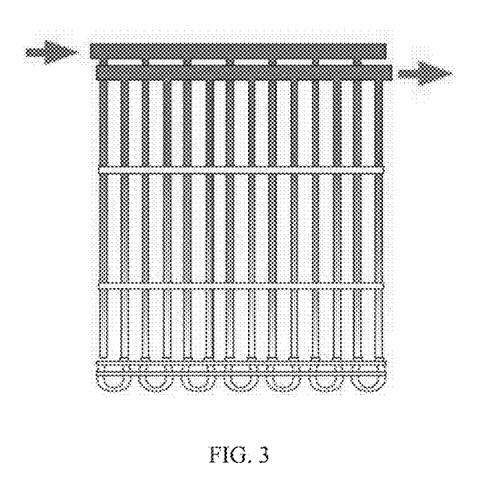
FIG. 3 is a structural schematic diagram of a thermal exchange pipeline in some embodiments of this application.

As shown in FIG. 3, a thermal exchange pipeline comprises a networked capillary pipeline, and there is no restriction on the shape of the thermal exchange pipeline herein. Understandably, this thermal exchange pipeline has an inlet and an outlet, and gaseous or liquid coolants will enter through the inlet and discharge through the outlet, flowing in the thermal exchange pipeline. Multiple parallel capillary pipelines can be arranged between such inlet and outlet, so that the coolants entering through the inlet can be dispersed into multiple parallel capillary pipelines, improving the thermal exchange efficiency.

A thermal management system is arranged on an electric vehicle. The thermal management system is communicated with a thermal exchange pipeline of the battery, and can provide a cooling function or a heating function for the battery through reasonable pipeline design and in combination with the phase-change (such as liquid to gas, or gas to liquid) of the coolants. That is, when the battery temperature is too high, the thermal management system will absorb the heat inside the battery to cool the battery under a cooling mode; when the battery temperature is too low, the thermal management system will provide heat for the inside of battery to heat the battery under a heating mode.

Figure 4:
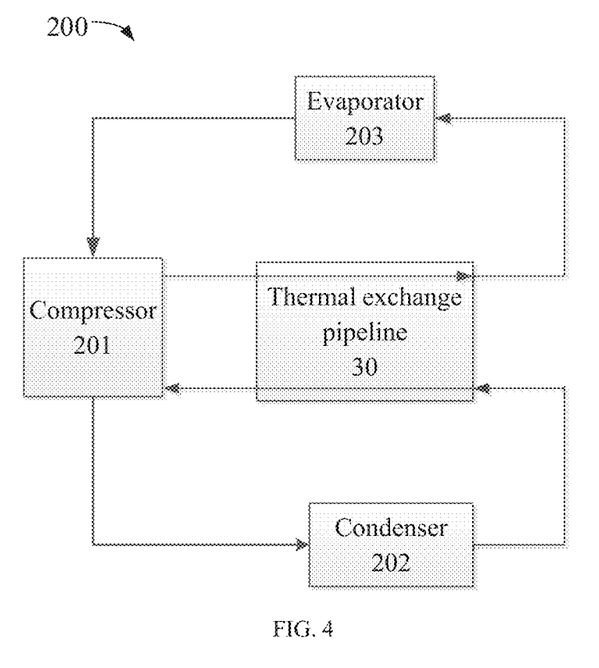
FIG. 4 is a structural schematic diagram of a thermal management system in some embodiments of this application.

According to some embodiments of this application, referring to FIG. 4, a thermal management system 200 comprises a compressor 201, a condenser 202, and an evaporator 203, wherein the compressor 201 and the condenser 202 form a cooling loop with a thermal exchange pipeline 30 of the battery, and the compressor 201 and the evaporator 203 form a heating loop with the thermal exchange pipeline 30 of the battery.

The compressor 201 is a driven fluid machinery to compress the low-pressure gas into the high pressure gas. The low-temperature & low-pressure coolants gas (such as freon) is sucked from the air inlet of the compressor 201, and the piston is driven by the operation of the motor to compress the low-temperature & low-pressure coolants gas and then discharge high-temperature & high-pressure coolants gas to the air outlet, providing power for the phase-change cycle of the coolants. The compressor 201 can be a piston compressor, a screw compressor, a centrifugal compressor and a linear compressor. In this embodiment, there is no restriction on the type or model of the compressor 201, and a person of skill in the art may choose the appropriate compressor based on the actual situation.

The condenser 202 is a thermal exchanger, which can turn a gas or a vapor into a liquid, that is, gas-into-liquid, and can quickly transit the heat dissipated during gas-into-liquid to the nearby air medium. The condenser 202 can be an air-cooled condenser, a water-cooled condenser and a spray condenser. In this embodiment, there is no restriction on the type or model of the condenser 202, and a person of skill in the art may choose the appropriate condenser based on the actual situation.

The evaporator 203 is a device that can convert liquid substance into gas. The low-temperature liquid coolants exchange heat with the ambient air through the evaporator 203 to turn into gaseous coolants, and the vaporization of coolants will absorb heat from the surrounding air. A person of skill in the art may choose the appropriate evaporator based on the actual situation.

Understandably, a "cooling channel" is arranged between the compressor 201 & the condenser 202 and the thermal exchange pipeline 30 to transmit and store the coolants (such as freon), which forms a cooling loop with the thermal exchange pipeline 30 of the battery. That is, in the cooling loop, the low-temperature & low-pressure gaseous coolants are compressed by the compressor 201 into high-temperature & high pressure gaseous coolants, which turn into liquid coolants after cooling and heat dissipation by the condenser 202, and the liquid coolants will flow into the thermal exchange pipeline 30 of the battery to absorb heat inside the battery, then the liquid coolants are evaporated into gaseous coolants, which can be compressed again by the compressor 201. Thus, the coolants are recycled in the cooling loop through the gas-liquid change. When passing through the thermal exchange pipeline 30, the coolants absorb the heat inside the battery to achieve the effect of cooling the battery, and the thermal exchange pipeline 30 is equivalent to an evaporator at this moment.

A "heating channel" is arranged between the compressor 201 & the evaporator 203 and the thermal exchange pipeline 30 to transmit and store the coolants, which forms a heating loop with the thermal exchange pipeline 30 of the battery. That is, in the heating loop, the low-temperature & low-pressure gaseous coolants are compressed by the compressor 201 into high-temperature & high pressure gaseous coolants, which turn into liquid coolants after entering the thermal exchange pipeline 30 to dissipate heat. The liquid coolants will enter the evaporator 203 for evaporation and then turn into gaseous coolants, which can be compressed again by the compressor 201. Thus, the coolants are recycled in the cooling loop through the gas-liquid change. When passing through the thermal exchange pipeline 30, the coolants dissipate heat to achieve the effect of heating the battery, and the thermal exchange pipeline 30 is equivalent to a condenser at this moment.

Understandably, the heating loop and the cooling loop share a compressor and a thermal exchange pipeline, and the heating loop and the cooling loop also share the same coolants. By controlling the conduct of the cooling loop or the heating loop, the coolants change phase when passing through the thermal exchange pipeline, providing a cooling function or a heating function.

Understandably, the compressor 201 the condenser 202 and the evaporator 203 can be arranged on electrical device (such as an electric vehicle). Based on that the condenser 202 during operation will dissipate heat to the surrounding air, heating the surrounding air to generate hot air, and the evaporator 203 during operation will absorb heat from the surrounding air, cooling the surrounding air to generate the cold air, thus, the location of the condenser 202 and the evaporator 203 can be reasonably arranged as required to achieve the secondary utilization of hot air and cold air. For example, an electric vehicle is used to give an exemplary description. The hot air generated by the condenser 202 in the thermal management system can be discharged into the cabin of the electric vehicle to warm the driver or passengers, and the cold air generated by the evaporator 203 can be discharged into the cabin of the electric vehicle to cool the driver or passengers. That is, in this embodiment, the evaporator 203 and the condenser 202 can be the evaporator and the condenser in the air conditioning system of an electric vehicle, namely, the air conditioning system and the thermal management system of the electric vehicle can share the evaporator and the condenser, and no additional condenser or evaporator is required when installing the thermal management system for the electric vehicle, which can reduce the overall cost, in addition, the reliability is improved due to simple structure.

Understandably, in other embodiments, the hot air generated by the operation of the condenser 202 or the cold air generated by the operation of the evaporator 203 can also be discharged out of the vehicle cabin as exhaust gas. A person of skill in this art may flexibly design based on the actual situation.

In the technical solutions of the embodiments of this application, a cooling loop is formed between a compressor & a condenser and a thermal exchange pipeline of the battery, and a heating loop is formed between a compressor & an evaporator and a thermal exchange pipeline, so that the thermal management system can provide a cooling function and a heating function for the battery, and in comparison with the direct cooling system and heating film form, this thermal management system features simple structure and high reliability. In addition, the location of the condenser and the evaporator can be reasonably arranged as required to achieve the secondary utilization of hot air and cold air.

Figure 5:
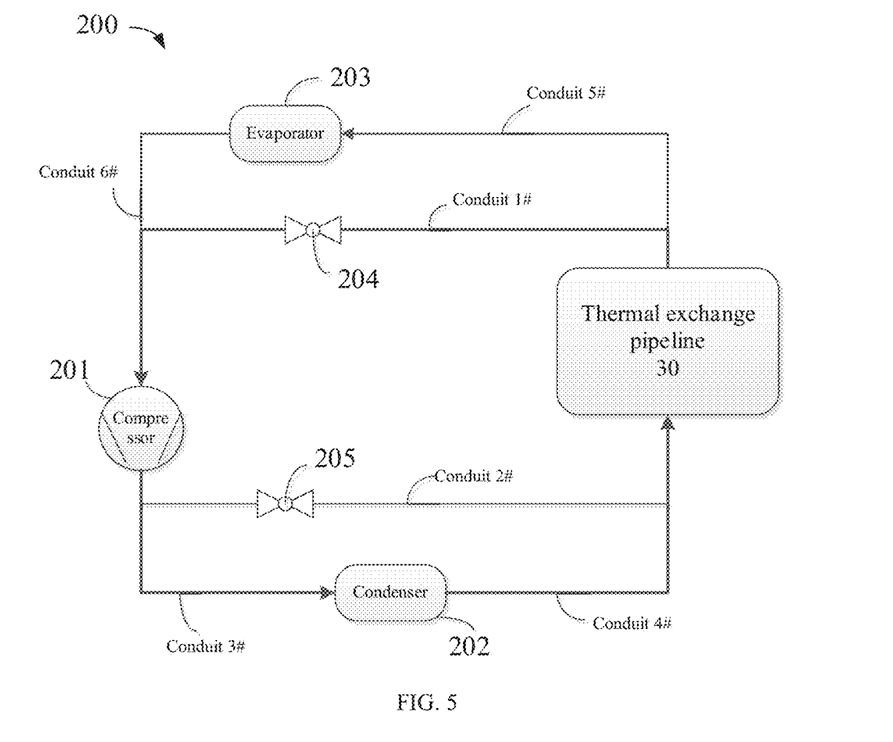
FIG. 5 is a structural schematic diagram of a thermal management system in some embodiments of this application.

According to some embodiments of this application, alternatively, referring to FIG. 5, said thermal management system 200 further comprises a first stop valve 204, a second stop valve 205 and a control device (not shown in the drawing), and the control device is communicated with the first stop valve 204 and the second stop valve 205, respectively. The air outlet of the compressor 201 is communicated with the first end of the condenser 202, the second end of the condenser 202 is communicated with the first end of the thermal exchange pipeline 30, and the air inlet of the compressor 201 is communicated with the second end of the thermal exchange pipeline 30 through the first stop valve 204, forming a cooling loop. The air outlet of the compressor 201 is communicated with the first end of the thermal exchange pipeline 30 through the second stop valve 205, the first end of the evaporator 203 is communicated with the second end of the thermal exchange pipeline 30, and the second end of the evaporator 203 is communicated with the air inlet of the compressor 201, forming a heating loop.

Understandably, the communication between any above two of the compressor 201, the condenser 202, the thermal exchange pipeline 30, the evaporator 203, the first stop valve 204 and the second stop valve 205 can be communicated by a conduit. Thus, the conduit acts as a transit channel for gaseous or liquid coolants.

The preceding "the air inlet of the compressor 201 is communicated with the second end of the thermal exchange pipeline 30 through the first stop valve 204" can be that a conduit 1# is connected between the air inlet of the compressor 201 and the second end of the thermal exchange pipeline 30, and the first stop valve 204 is arranged on the conduit 1#. The preceding "the air outlet of the compressor 201 is communicated with the first end of the thermal exchange pipeline 30 through the second stop valve 205" can be that a conduit 2# is connected between the air outlet of the compressor 201 and the first end of thermal exchange pipeline 30, and the second stop valve 205 is arranged on the conduit 2#. Understandably, based on the flow direction of coolants, the first end of the thermal exchange pipeline 30 is equivalent to its inlet, and the second end of the thermal exchange pipeline 30 is equivalent to its outlet.

The preceding "the air outlet of the compressor 201 is communicated with the first end of the condenser 202" can be that a conduit 3# is connected between the air outlet of the compressor 201 and the first end of the condenser 202. The preceding "the second end of the condenser 202 is communicated with the first end of the thermal exchange pipeline 30" can be that a conduit 4# is connected between the second end of the condenser 202 and the first end of the thermal exchange pipeline 30. The preceding "the first end of the evaporator 203 is communicated with the second end of the thermal exchange pipeline 30" can be that a conduit 5# is connected between the first end of the evaporator 203 and the second end of the thermal exchange pipeline 30. The preceding "the second end of the evaporator 203 is communicated with the air inlet of the compressor 201" can be that a conduit 6# is connected between the second end of the evaporator 203 and the air inlet of the compressor 201.

Understandably, the reference numerals in conduits 1# through 6# are simply intended to distinguish the conduits, and the reference numerals 1# through 6# do not define conduits in any way. The conduits 1# through 6# can be the same type of conduit, for example, rigid conduits or soft conduits.

The first stop valve 204 and the second stop valve 205 are the electronic switches used to control the coolants, for example, they can be solenoid valves or electric valves. When the first stop valve 204 is opened, the conduit 1# where the first stop valve 204 is located will be conducted, when the first stop valve 204 is closed, the conduit 1# where the first stop valve 204 is located will not be conducted. Similarly, when the second stop valve 205 is opened, the conduit 2# where the second stop valve 205 is located will be conducted, when the second stop valve 205 is closed, the conduit 2# where the second stop valve 205 is located will not be conducted.

The control device can be a general-purpose processor, a digital signal processor (DSP), an application specific integrated circuit (ASIC), a field programmable gate array (FPGA), a microcontroller, an ARM (Acorn RISC Machine) or other programmable logic component, discrete component gate or transistor logic, discrete hardware component, or any combination thereof.

Based on that the control device is communicated with the first stop valve 204 and the second stop valve 205, respectively, thus, when the conduct of cooling loop is required, the control device will control the opening of the first stop valve 204 and the closing of the second stop valve 205, when the conduct of heating loop is required, the control device will control the opening of the second stop valve 205 and the closing of the first stop valve 204.

In the embodiments of this application, based on the structure of said cooling loop and heating loop, the control device may select to conduct the cooling loop or the heating loop by opening the first stop valve 204 or the second stop valve 205 accordingly. When the cooling loop is conducted, the compressor 201 and the condenser 202 are operating to provide a cooling function for the battery. When the heating loop is conducted, the compressor 201 and the evaporator 203 are operating to provide a heating function for the battery. That is, the thermal management system can provide both a cooling function and a heating function, and the thermal management system features simple structure, easy control and high reliability.

According to some embodiments of this application, alternatively, the thermal management system further comprises an energy accumulator, and the coolants are stored in the energy accumulator.

The energy accumulator can be a vessel with an air inlet and an air outlet. The air outlet and the air outlet of the energy accumulator are connected to the heating loop and the cooling loop, respectively. The coolants are stored in the energy accumulator when the thermal management system is not operating. When the thermal management system is operating, the coolants in the energy accumulator are sucked away by the compressor, now the energy accumulator can buffer the pressure to prevent the pipeline of the thermal management system from breaking due to excessive pressure.

In the embodiments of this application, the energy accumulator is arranged to store sufficient coolants on the one hand, and to buffer the pressure on the other hand to prevent the pipeline of the thermal management system from breaking due to excessive pressure.

Figure 6:
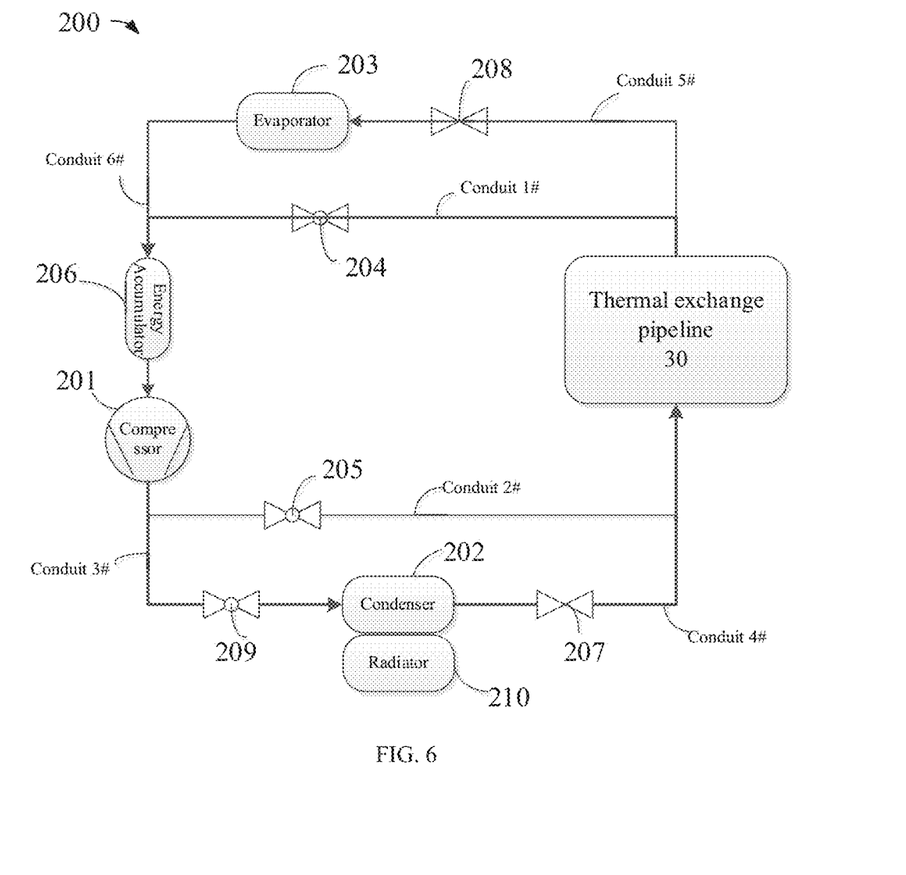
FIG. 6 is a structural schematic diagram of a thermal management system in some embodiments of this application.

According to some embodiments of this application, alternatively, referring to FIG. 6, the air inlet of the energy accumulator 206 is communicated with the second end of the evaporator 203, the air inlet of the energy accumulator 206 is communicated with the second end of the thermal exchange pipeline 30 through the first stop valve 204, and the air outlet of the energy accumulator 206 is communicated with the air inlet of the compressor 201.

The energy accumulator 206 is equivalently arranged on the conduit 6#, the air outlet of the energy accumulator 206 is communicated with the air inlet of the compressor 201 through the conduit 6#, the air inlet of the energy accumulator 206 is communicated with the second end of the evaporator 203 through the conduit 6#, and one end of the conduit 1# is communicated with the air inlet of the energy accumulator 206. That is, one end of the conduit 1# and one end of the conduit 6# converge at the air inlet of the energy accumulator 206.

In the embodiments of this application, the energy accumulator is arranged in the above manner, so that the energy accumulator can be located in both a cooling loop and a heating loop, that is, whether the thermal management system operates under a cooling mode or a heating mode, the energy accumulator can provide coolants and buffer the pressure, in addition, the above arrangement manner has a simple structure.

According to some embodiments of this application, alternatively, referring again to FIG. 6, the thermal management system 200 further comprises a first expansion valve 207. The first end of the first expansion valve 207 is communicated with the second end of the condenser 202, and the second end of the first expansion valve 207 is communicated with the first end of the thermal exchange pipeline 30.

The first expansion valve 207 plays a throttling role, that is, the liquid coolants turn into the low-temperature low-pressure vaporous liquid coolants after passing through the first expansion valve 207, providing conditions for the heat absorption and the evaporation of liquid coolants in the thermal exchange pipeline. On the other hand, the first expansion valve 207 can further control the flow of liquid coolants, which can ensure that the coolants transmitted to the second end (outlet) of the thermal exchange pipeline 30 are completely gaseous. The first expansion valve 207 can be an electronic expansion valve. The electronic expansion valve is known to a person of skill in the art, so the structure and working principle of electronic expansion valve are not introduced in details herein.

The first expansion valve 207 is equivalently arranged on the conduit 4#, so that the liquid coolants output by the condenser 202 will flow into the thermal exchange pipeline 30 for thermal exchange after being throttled and controlled by the first expansion valve 207. The first expansion valve 207 is communicated with a control device, thus, when the conduct of the cooling loop is required, the control device will control the conduct of the first expansion valve 207 and the opening of the first stop valve 204.

In the embodiments of this application, a first expansion valve 207 is arranged between the condenser 202 and the thermal exchange pipeline 30, so that the coolants entering the thermal exchange pipeline 30 is in a vapor state, facilitating the full evaporation of coolants in the thermal exchange pipeline 30 after absorbing the heat, with a high thermal exchange efficiency, in addition, this arrangement further can control the flow of coolants entering the thermal exchange pipeline 30, so a negative impact will not occur due to excessive or insufficient flow of coolants.

According to some embodiments of this application, alternatively, referring again to FIG. 6, the thermal management system 200 further comprises a second expansion valve 208. The first end of the second expansion valve 208 is communicated with the first end of the evaporator 203, and the second end of the second expansion valve 208 is communicated with the second end of the thermal exchange pipeline 30.

The second expansion valve 208 plays a throttling role, that is, the liquid coolants turn into the loin-temperature & low-pressure vaporous liquid coolants after passing through the second expansion valve 208, providing conditions for the heat absorption and evaporation of liquid coolants in the evaporator 203. On the other hand, the second expansion valve 208 can further control the flow of liquid coolants, which can ensure that the coolants transmitted to the evaporator 203 are completely evaporated into gas. The second expansion valve 208 can be an electronic expansion valve. The electronic expansion valve is known to a person of skill in the art, so the structure and working principle of electronic expansion valve are not introduced in details herein.

The second expansion valve 208 is equivalently arranged on the conduit 5#, so that the liquid coolants output by the thermal exchange pipeline 30 will flow into the evaporator 203 for evaporation after being throttled and controlled by the second expansion valve 208. The second expansion valve 208 is communicated with a control device, thus, when the conduct of the heating loop is required, the control device will control the conduct of the second expansion valve 208 and the opening of the second stop valve 205.

In the embodiments of this application, a second expansion valve 208 is arranged between the evaporator 203 and the thermal exchange pipeline 30, so that the coolants entering the evaporator 203 is in a vapor state, facilitating the full evaporation of coolants in the evaporator 203 after absorbing the heat, with an evaporation efficiency, in addition, this arrangement further can control the flow of coolants entering the evaporator 203, so an incomplete evaporation will not occur due to excessive flow of coolants.

According to some embodiments of this application, alternatively, referring again to FIG. 6, the thermal management system 200 further comprises a third stop valve 209. The third stop valve 209 is arranged on the pipeline between the air outlet of the compressor 201 and the first end of the condenser 202.

The third stop valve 209 is an electronic switch for fluid control, for example, it can be a solenoid valve or an electric valve. The third stop valve 209 is communicated with a control device, thus, the control device can control the opening or the dosing of the third stop valve 209.

"The third stop valve 209 is arranged on the pipeline between the air outlet of the compressor 201 and the first end of the condenser 202" can be that a third stop valve 209 is arranged on the conduit 3#, so that the gaseous coolants discharged from the air outlet of the compressor 201 will enter the condenser 202 after passing through the third stop valve 209.

When the conduct of the cooling loop is required, the control device will control the opening of the third stop valve 209, so that the gaseous coolants can enter the condenser 202. When the conduct of the heating loop is required, the control device will control the closing of the third stop valve 209, avoiding coolants entering the condenser 202 under heating mode to affect the heating effect. In addition, under the stopping by the third stop valve 209, the gaseous coolants will fully enter the thermal exchange pipeline through the second stop valve 205, with a high heating efficiency.

In the embodiment of this application, a third stop valve 209 is arranged on the pipeline between the air outlet of the compressor 201 and the first end of the condenser 202. When the conduct of heating loop is required, the control device will control the closing of the third stop valve 209, avoiding coolants entering the condenser 202 under heating mode, that is, under the stopping by the third stop valve 209, the gaseous coolants will fully enter the thermal exchange pipeline through the second stop valve, with a high heating efficiency.

According to some embodiments of this application, alternatively, referring again to FIG. 6, the thermal management system 200 further comprises a radiator 210. The radiator 210 is a device used to conduct and release heat, for example, the radiator 210 can be a fan. Thus, the radiator 210 can be used to cool the condenser 202, that is, the heat dissipated by the condenser 202 to the surrounding air is further transmitted to the external environment.

In some embodiments, when the electrical device is an electric vehicle, the radiator 210 can be arranged to dissipate the heat generated by the condenser 202 into the vehicle cabin to warm the user. Alternatively, the radiator 210 can be arranged to dissipate heat generated by the condenser 202 out of the vehicle.

Based on that the radiator 210 is communicated with the control device, thus, the control device can control the radiator 210 to start or stop operation as required. Specifically, when the conduct of the cooling loop is required, the radiator 210 is controlled to start operation for heat dissipation of the condenser 202; when the conduct of the heating loop is required, the radiator 210 is controlled to stop operation.

In the embodiment of this application, the heat accumulation around the condenser 202 can be effectively avoided by arranging the radiator 210 to dissipate heat for the condenser 202, so that the condenser 202 can achieve a better condensation effect, thus improving the cooling effect of the thermal management system 200.

According to some embodiments of this application, referring to FIG. 6, this application provides a thermal management system 200 comprising a compressor 201, a condenser 202, an evaporator 203, a radiator 210 and a control device (not shown in the drawing). A conduit 1# is connected between the air inlet of the compressor 201 and the second end of a thermal exchange pipeline 30, and a first stop valve 204 is arranged on the conduit 1#. A conduit 2# is connected between the air outlet of the compressor 201 and the first end of the thermal exchange pipeline 30, and a second stop valve 205 is arranged on the conduit 2#. A conduit 3# is connected between the air outlet of the compressor 201 and the first end of the condenser 202, and a third stop valve 209 is arranged on the conduit 3#. A conduit 4# is connected between the second end of the condenser 202 and the first end of the thermal exchange pipeline 30, and a first expansion valve 207 is arranged on the conduit 4#. A conduit 5# is connected between the first end of the evaporator 203 and the second end of the thermal exchange pipeline 30, and a second expansion valve 208 is arranged on the conduit 5#. A conduit 6# is connected between the second end of the evaporator 203 and the air inlet of the compressor 201, an energy accumulator 206 is arranged on the conduit 6#, and one end of the conduit 1# and one end of the conduit 6# converge at the air inlet of the energy accumulator 206. The radiator 210 is arranged around the condenser 202 to dissipate heat for the condenser 202.

A control device is respectively communicated with the compressor 201, the condenser 202, the evaporator 203, the radiator 210, the first stop valve 204, the second stop valve 205, the third stop valve 209, the first expansion valve 207 and the second expansion valve 208. When the thermal management system 200 is required to provide a cooling function for the battery (that is, under cooling mode), the control device will control the opening of the first stop valve 204, the closing of the second stop valve 205, the opening of the third stop valve 209, the conduct of the first expansion valve 207, the closing of the second expansion valve 208, and the control device will further control the operation of the compressor 201, the condenser 202 and the radiator 210. Thus, the gaseous coolants are sucked by the compressor 201 from the energy accumulator 206, and after being compressed, the gaseous coolants will enter the condenser 202 through the third stop valve 209 to be condensed into liquid coolants. Meanwhile, the heat dissipated by the condenser 202 in the condensation process is taken away by the radiator 210. The liquid coolants will enter the thermal exchange pipeline 30 after passing through the first expansion valve 207, and the liquid coolants will evaporate after absorbing the heat inside the battery, cooling the battery. Finally, the vaporized gaseous coolants will enter the energy accumulator 206 through the first stop valve 204 to re-enter the compressor 201 for the next cooling cycle.

When the thermal management system 200 is required to provide a heating function for the battery (that is, under heating mode), the control device will control the opening of the second stop valve 205, the closing of the first stop valve 204, the closing of the third stop valve 209 and the conduct of the second expansion valve 207, and the control device will further control the operation of the compressor 201 and the evaporator 203. Thus, the gaseous coolants are sucked into the compressor 201 from the energy accumulator 206 to be compressed into the high-temperature & high-pressure gaseous coolants, and then will enter the thermal exchange pipeline 30 through the second stop valve 205. The high-temperature & high-pressure gaseous coolants will release heat to achieve the heating of the battery, and after the heat is absorbed, the gaseous coolants are liquefied into the liquid coolants. Then, the liquid coolants will pass through the second expansion valve 208 to enter the evaporator 203 for evaporation and the evaporated gaseous coolants will enter the energy accumulator 206 to re-enter the compressor 201 for the next heating cycle.

In addition, the compressor, the condenser and the evaporator can all be arranged on the electrical device (such as an electric vehicle). The hot air generated by the condenser in the thermal management system can be discharged into the cabin of the electric vehicle to warm the driver or passengers, and the cold air generated by the evaporator can be discharged into the cabin of the electric vehicle to cool the driver or passengers. That is, in this embodiment, the evaporator and the condenser can be the evaporator and condenser in the air conditioning system of an electric vehicle, namely, the air conditioning system and the thermal management system of the electric vehicle can share the evaporator and the condenser, and no additional condenser or evaporator is required when installing the thermal management system for the electric vehicle, which can reduce the overall cost, and the reliability can be improved due to simple structure, moreover, the secondary utilization of hot air and cold air can be achieved.

In the technical solutions of the embodiments of this application, a cooling loop is formed between a compressor & a condenser and a thermal exchange pipeline of the battery, and a heating loop is formed between a compressor & an evaporator and a thermal exchange pipeline, so that the thermal management system can provide a cooling function and a heating functions for the battery, and this thermal management system features simple structure and high reliability. In addition, the location of the condenser and the evaporator can be reasonably arranged as required to achieve the secondary utilization of hot air and cold air.

According to some embodiments of this application, referring to FIG. 4, the thermal management system 200 comprises a compressor 201, a condenser 202, and an evaporator 203, wherein the compressor 201 and the condenser 202 form a cooling loop with a thermal exchange pipeline 30 of the battery, and the compressor 201 and the evaporator 203 form a heating loop with the thermal exchange pipeline 30 of the battery.

Understandably, the thermal management system 200 further comprises a processor and a memory in a communication connection (not shown in the drawing), and the processor is further communicated with the compressor 201, the condenser 202 and the evaporator 203, respectively. The memory stores instructions that can be executed by the processor so as to enable the processor to perform the following control methods of the thermal management system.

The memory may comprise a read-only memory and a random access memory, and provide instructions and data to the processor. Some memory can further be a non-volatile random access memory (NVRAM). Memory stores operating instructions, executable modules, or data structures, or subsets/extended sets thereof.

The processor can be an integrated circuit chip with signal processing capability. In the process of implementation, each step in the control method of the following thermal management system can be completed either by the integrated logic circuit of the hardware in the processor or by the instructions in the form of software. Said processor can be a general-purpose processor, a digital signal processor (DSP), a microprocessor or a microcontroller, and may further comprise an application specific integrated circuit (ASIC), a field programmable gale array (FPGA), or other programmable logic components, discrete component gate, transistor logic, discrete hardware components. The processor can implement or execute the control methods of the following thermal management system.

Figure 7:
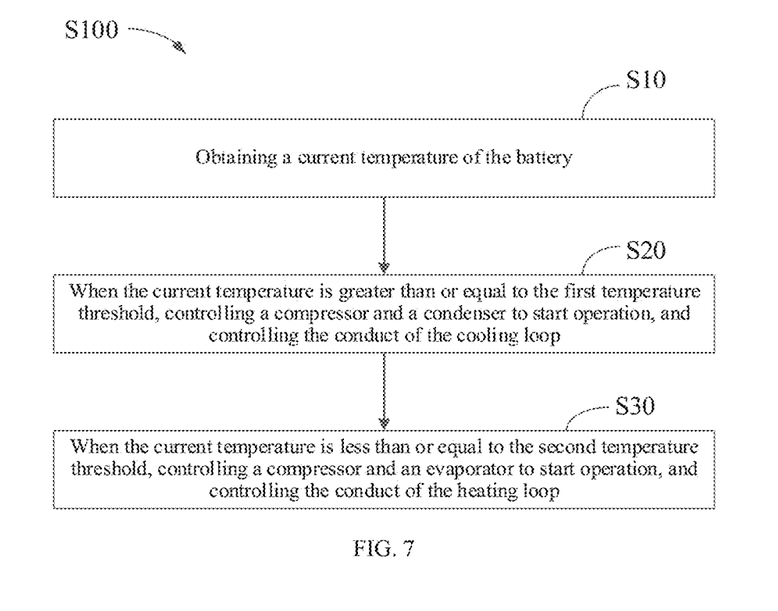
FIG. 7 is a flow schematic diagram of a control method under a thermal management system in some embodiments of this application.

Please refer to FIG. 7 for the flow diagram provided in the embodiment of this application regarding the control method of the thermal management system. Specially, the method S100 can comprise the following steps:

S10: acquiring the current temperature of battery.

S20: when the current temperature is greater than or equal to the first temperature threshold, controlling the compressor and the condenser to start operation, and controlling the conduct of the cooling loop.

S30: when the current temperature is less than or equal to the second temperature threshold, controlling the compressor and the evaporator to start operation, and controlling the conduct of the heating loop.

The first temperature threshold is greater than the second temperature threshold. Understandably, the first temperature threshold is a high temperature threshold, that is, the operating temperature of battery can't be higher than the first temperature threshold. The second temperature threshold is a low temperature threshold, that is, the operating temperature of battery can't be lower than the second temperature threshold.

A current temperature is the battery internal temperature collected in real time. For example, a battery management system (BMS) inside the battery monitors the temperature at least at one location in real time, and the average of the monitored temperatures can be taken as the current temperature. Based on the communication connection between the battery and the thermal management system, the battery can send the current temperature to the processor of the thermal management system.

The current temperature once obtained is compared with the first temperature threshold and the second temperature threshold, respectively. When the monitored current temperature is greater than or equal to the first temperature threshold, indicating that the internal temperature of the battery is too high, the compressor and the condenser are controlled to start operation, and the cooling loop is controlled to be conducted, so that after passing through the compressor and the condenser, the gaseous coolants are transited into the thermal exchange pipeline to absorb the heat inside the battery for cooling the battery, then, the gaseous coolants return to the compressor for cyclic cooling.

When the monitored current temperature is less than or equal to the second temperature threshold, indicating that the battery internal temperature is too low, the compressor and the evaporator are controlled to start operation, and the heating loop is controlled to be conducted, so that the gaseous coolants pass through the compressor to turn into the high-temperature & high pressure gaseous coolants, and then are transited into the thermal exchange pipeline to provide heat to the inside of the battery for heating the battery. The coolants after dissipating heat turn into liquid coolants, and will enter the evaporator to be evaporated into gaseous coolants, and then return to the compressor for cyclic heating.

Understandably, the compressor, the condenser and the evaporator can be arranged on electrical device (such as an electric vehicle). Based on that the condenser during operation will dissipate heat to the surrounding air, heating the surrounding air to generate hot air, and the evaporator during operation will absorb heat from the surrounding air, cooling the surrounding air to generate cold air, thus, the location of the condenser and the evaporator can be reasonably arranged as required and in combination with controlling accordingly to achieve the secondary utilization of hot air and cold air. For example, the electric vehicle is used to give an exemplary description. The electric vehicle is equipped with a condensation chamber, and the condensation chamber has a first air inlet, a first air outlet and a second air outlet. The first air inlet is communicated with the outside of cabin, the first air outlet is communicated with the inside of cabin, and the second air outlet is communicated with the outside of cabin. The first air outlet is equipped with a first air door, the second air outlet is equipped with a second air door, and the condenser is arranged in the condensation chamber, so that the condenser during operation will cool the air in the condensation chamber. By controlling the opening of the first air door and the closing of the second air door, the cold air can be blown into the cabin to cool the user. By controlling the closing of the first air door and the opening of the second air door, the cold air can be blown to the external environment. Similarly, the electric vehicle is also equipped with an evaporation chamber, and the evaporation chamber has a second air inlet, a third air outlet and a fourth air outlet. The second air inlet is communicated with the outside of cabin, the third air outlet is communicated with the inside of cabin, and the fourth air outlet is communicated with the outside of cabin, The third air outlet is equipped with a third air door, the fourth air outlet is equipped with a fourth air door, and the evaporator is arranged in the evaporation chamber, so that the evaporator during operation will heat the air in the evaporation chamber. By controlling the opening of the third air door and the closing of the fourth air door, the hot air can be blown into the cabin to warm the user. By controlling the closing of the third air door and the opening of the fourth air door, the hot air can be blown to the external environment.

In the technical solutions of the embodiment of this application, a real-time current temperature of the battery is obtained. When the current temperature is greater than or equal to the first temperature threshold, the compressor and the condenser are controlled to start operation, and the cooling loop is controlled to be conducted. When the current temperature is less than or equal to the second temperature threshold, the compressor and the evaporator are controlled to start operation, and the heating loop is controlled to be conducted, thus providing a cooling function and a heating function for the battery. In addition, the corresponding air outlets of the condenser and the evaporator can be reasonably controlled as required to achieve the secondary utilization of hot air and cold air.

According to some embodiments of this application, alternatively, referring to FIG. 5, the thermal management system 200 further comprises a first stop valve 204 and a second stop valve 205. The air outlet of the compressor 201 is communicated with the first end of the condenser 202, the second end of the condenser 202 is communicated with the first end of the thermal exchange pipeline 30, and the air inlet of the compressor 201 is communicated with the second end of the thermal exchange pipeline 30 through the first stop valve 204, forming a cooling loop. The air outlet of the compressor 201 is communicated with the first end of the thermal exchange pipeline 30 through the second stop valve 205, the first end of the evaporator 203 is communicated with the second end of the thermal exchange pipeline 30, and the second end of the evaporator 203 is communicated with the air inlet of the compressor 201, forming a heating loop.

That is, a conduit 1# is connected between the air inlet of the compressor 201 and the second end of the thermal exchange pipeline 30, and a first stop valve 204 is arranged on the conduit 1#. A conduit 2# is connected between the air outlet of the compressor 201 and the first end of the thermal exchange pipeline 30, and a second stop valve 205 is arranged on the conduit 2#. A conduit 3# is connected between the air outlet of the compressor 201 and the first end of the condenser 202. A conduit 4# is connected between the second end of the condenser 202 and the first end of the thermal exchange pipeline 30. A conduit 5# is connected between the first end of the evaporator 203 and the second end of the thermal exchange pipeline 30. A conduit 6# is connected between the second end of the evaporator 203 and the air inlet of the compressor 201.

The preceding "controlling the conduct of the cooling loop" comprises:

S21: controlling the opening of the first stop valve and the closing of the second stop valve to conduct the cooling loop.

In this embodiment, the cooling loop successively comprises a compressor, a condenser, a thermal exchange pipeline and a first stop valve, therefore, when controlling the conduct of the cooling loop, the first stop valve is required to be controlled in opening. Since the branch formed by the conduit 3# and the conduit 4# is in parallel with the conduit 2#, the second stop valve is required to be closed to prevent the coolants from entering the heating loop during the cooling.

The preceding "controlling the conduct of the heating loop" comprises:

Controlling the closing of the first stop valve and the opening of the second stop to conduct the heating loop.

In this embodiment, the heating loop successively comprises a compressor, a second stop valve, a thermal exchange pipeline and an evaporator, therefore, when controlling the conduct of the heating loop, the second stop valve is required to be controlled in opening. Since the branch formed by the conduit 4# and the conduit 6# is in parallel with the conduit 1#, the first stop valve is required to be closed to prevent the coolants from entering the cooling loop during the heating.

By controlling the opening of the first stop valve and the closing of the second stop valve, the cooling loop can be conducted. By controlling the closing of the first stop valve and the opening of the second stop valve, the heating loop can be conducted. The control is simple, Which can improve the reliability.

According to some embodiments of this application, alternatively, referring again to FIG. 6, the thermal management system 200 further comprises a first expansion valve 207. The first end of the first expansion valve 207 is communicated with the second end of the condenser 202, and the second end of the first expansion valve 207 is communicated with the first end of the thermal exchange pipeline 30.

The first expansion valve 207 is equivalently arranged on the conduit 4#. The first expansion valve 207 can be an electronic expansion valve.

The preceding "controlling the conduct of said cooling loop" further comprises:

S22: controlling the connection of the first expansion valve.

In this embodiment, the cooling loop successively comprises a compressor, a condenser, a first expansion valve, a thermal exchange pipeline and a first stop valve, therefore, when controlling the conduct of the cooling loop, in addition to controlling the opening of the first stop valve and the closing of the second stop valve, it is also required to control the connection of the first expansion valve.

During the cooling, the first expansion valve is controlled to be open, so that the coolants entering the thermal exchange pipeline is in a vapor state, facilitating the full evaporation of coolants in the thermal exchange pipeline after absorbing the heat, with a high thermal exchange efficiency, in addition, this arrangement further can control the flow of coolants entering the thermal exchange pipeline, so a negative impact will not occur due to excessive or insufficient flow of coolants.

According to some embodiments of this application, alternatively, referring again to FIG. 6, the thermal management system 200 further comprises a second expansion valve 208. The first end of the second expansion valve 208 is communicated with the first end of the evaporator 203, and the second end of the second expansion valve 208 is communicated with the second end of the thermal exchange pipeline 30.

The second expansion valve 208 is equivalently arranged on the conduit 5#. The second expansion valve 208 can be an electronic expansion valve.

The preceding "controlling the conduct of the heating loop" further comprises:

S32: controlling the connection of the second expansion valve.

In this embodiment, the heating loop successively comprises a compressor, a second stop valve, a thermal exchange pipeline, a second expansion valve and an evaporator, therefore, when controlling the conduct of the heating loop, in addition to controlling the opening of the second stop valve and the closing of the first stop valve, it is also required to control the connection of the second expansion valve.

During the heating, the second expansion valve is controlled to be open, so that the coolants entering the evaporator is in a vapor state, facilitating the full evaporation of coolants in the evaporator after absorbing the heat, with a high evaporation efficiency, in addition, this arrangement further can control the flow of coolants entering the evaporator, so an incomplete evaporation will not occur due to excessive flow of coolants.

According to some embodiments of this application, alternatively, referring again to FIG. 6, the thermal management system 200 further comprises a third stop valve 209. The third stop valve 209 is arranged on the pipeline between the air outlet of the compressor 201 and the first end of the condenser 202

The third stop valve 209 is an electronic switch for fluid control, for example, it can be a solenoid valve or an electric valve. The third stop valve 209 is arranged on the conduit 3#, so that the gaseous coolants discharged from the air outlet of the compressor 201 will enter the condenser 202 after passing through the third stop valve 209.

The preceding "controlling the conduct of the cooling loop" further comprises:

S23: controlling the opening of the third stop valve.

When the conduct of cooling loop is required, the third stop valve is controlled to be opened so that the gaseous coolants can enter the condenser. When the conduct of heating loop is required, the third stop valve is controlled to be closed to avoid the heating effect being affected by the coolants entering the condenser under heating mode. In addition, under the stopping by the third stop valve, the gaseous coolants will fully enter the thermal exchange pipeline through the second stop valve, with a high heating efficiency.

According to some embodiments of this application, alternatively, referring again to FIG. 6, the thermal management system 200 further comprises a radiator 210. The radiator 210 is a device used to conduct and release heat, for example, the radiator 210 can be a fan. Thus, the radiator 210 can be used to cool the condenser 202, that is, the heat dissipated by the condenser 202 to the surrounding air is further transmitted to the external environment.

Said method S100 further comprises:

S40: controlling the radiator to start operation when the current temperature is greater than or equal to the first temperature threshold.

When the current temperature is greater than or equal to the first temperature threshold, the conduct of cooling loop is required. When the cooling loop is conducted, the radiator is controlled to start operation to dissipate heat for the condenser.

The heat accumulation around the condenser can be effectively avoided by controlling the radiator to start operation for heat dissipation of the condenser, so that the condenser can achieve a better condensation effect, thus improving the cooling effect of the thermal management system.

According to some embodiments of this application, this application further provides an electrical device, said thermal management system and said battery.

In the above implementation, the thermal management system can provide a cooling function and a heating function for the battery, with simple structure and high reliability, facilitating the normal operation of electrical device in high or low temperature environment.

Please note that, the above embodiments are simply used to describe the technical solutions of this application but not to restrict it. Notwithstanding the detailed description of this application with reference to the preceding embodiments, a person of ordinary skill in the art understands that, the technical solutions recorded in the preceding embodiments can be modified, or equivalent substitutions of some or all of the technical features thereof can be made. Such modifications or substitutions will not depart the essence of the technical solutions from the scope of various embodiments of this application, and swill be covered by the scope of the claims and the description of this application. Particularly, the technical features mentioned in various embodiments can be combined in any manner provided that there is no structural conflict. This application is not limited to the specific embodiments disclosed herein, but covers all technical solutions falling within the scope of the claims.

What is claimed is:

1. A thermal management system, comprising:
   a compressor, a condenser and an evaporator;
   wherein the compressor and the condenser form a cooling loop with a thermal exchange pipeline of a battery, the thermal exchange pipeline comprising multiple capillary pipelines; and
   the compressor and the evaporator form a heating loop with the thermal exchange pipeline,
   wherein the system further comprises a first stop valve, a second stop valve and a circuitry, the circuitry being communicated with the first stop valve and the second stop valve, respectively;
   an air outlet of the compressor is communicated with a first end of the condenser, a second end of the condenser is communicated with a first end of the thermal exchange pipeline, and an air inlet of the compressor is communicated with a second end of the thermal exchange pipeline through the first stop valve, to form the cooling loop;
   the air outlet of the compressor is communicated with the first end of the thermal exchange pipeline through the second stop valve, a first end of the evaporator is communicated with the second end of the thermal exchange pipeline, and a second end of the evaporator is communicated with the air inlet of the compressor, to form the heating loop; and
   the circuitry is configured to control opening of the first stop valve and closing of the second stop valve to conduct the cooling loop, alternatively, to control closing of the first stop valve and opening of the second stop valve to conduct the heating loop.

2. The system according to claim 1, wherein the system further comprises an energy accumulator for storing coolants.

3. The system according to claim 2, wherein an air inlet of the energy accumulator is communicated with the second end of the evaporator, the air inlet of the energy accumulator is communicated with the second end of the thermal exchange pipeline through the first stop valve, and an air outlet of the energy accumulator is communicated with the air outlet of the compressor.

4. The system according to claim 1, wherein the system further comprises a first expansion valve, a first end of the first expansion valve being communicated with the second end of the condenser, and a second end of the first expansion valve being communicated with the first end of the thermal exchange pipeline;
   the first expansion valve is communicated with the circuitry, and the circuitry is further configured to control connection of the first expansion valve when conducting the cooling loop.

5. The system according to claim 4, wherein the system further comprises a second expansion valve a first end of the second expansion valve being communicated with the first end of the evaporator, and a second end of the second expansion valve being communicated with the second end of the thermal exchange pipeline;
   the second expansion valve is connected with the circuitry, and the circuitry is further used to control connection of the second expansion valve when conducting the heating loop.

6. The system according to claim 5, wherein the system further comprises a third stop valve arranged on a pipeline between the air outlet of the compressor and the first end of the condenser,
   the third stop valve is communicated with the circuitry, and the circuitry is further configured to control opening of the third stop valve when conducting the cooling loop, alternatively, to control closing of the third stop valve when conducting the heating loop.

7. The system according to claim 1, wherein the system further comprises a radiator, configured to dissipate heat for the condenser,
   the radiator is communicated with the circuitry, and the circuitry is further configured to control starting of the radiator when conducting the cooling loop, alternatively, to control stopping of the radiator when conducting the heating loop.

8. A control method for a thermal management system, wherein the thermal management system comprises a compressor, a condenser and an evaporator, the compressor and the condenser forming a cooling loop with a thermal exchange pipeline of a battery, the thermal exchange pipeline comprising multiple capillary pipelines, and the compressor and the evaporator forming a heating loop with the thermal exchange pipeline, the method comprises:

acquiring a current temperature of the battery;

controlling starting of the compressor and the condenser when the current temperature is greater than or equal to a first temperature threshold, and, controlling conduct of the cooling loop;

controlling the starting of the compressor and the evaporator when the current temperature is less than or equal to a second temperature threshold, and, controlling conduct of the heating loop;

wherein the first temperature threshold is greater than the second temperature threshold;

wherein the thermal management system further comprises a first stop valve and a second stop valve, an air outlet of the compressor is communicated with a first end of the condenser, a second end of the condenser is communicated with a first end of the thermal exchange pipeline, and an air inlet of the compressor is communicated with a second end of the thermal exchange pipeline through the first stop valve, to form the cooling loop. the air outlet of the compressor is communicated with a first end of the thermal exchange pipeline through the second stop valve, a first end of the evaporator is communicated with the second end of the thermal exchange pipeline, and a second end of the evaporator is communicated with the air inlet of the compressor, forming the heating loop;

the controlling the conduct of the cooling loop comprises:

controlling the opening of the first stop valve and the closing of the second stop valve to conduct the cooling loop; and the controlling the conduct of the heating loop comprises:

controlling the closing of the first stop valve and the opening of the second stop to conduct the heating loop.

9. The method according to claim 8, wherein the thermal management system further comprises a first expansion valve, the first end of the first expansion valve is communicated with the second end of the condenser, and the second end of the first expansion valve is communicated with the first end of the thermal exchange pipeline;

the controlling the conduct of the cooling loop further comprises:

controlling the connection of the first expansion valve.

10. The method according to claim 9, wherein the thermal management system further comprises a second expansion valve, the first end of the second expansion valve is communicated with the first end of the evaporator, and the second end of the second expansion valve is communicated with the second end of the thermal exchange pipeline;

the controlling the conduct of the heating loop further comprises:

controlling connection of the second expansion valve.

11. The method according to claim 10, wherein the thermal management system further comprises a third stop valve arranged on a pipeline between the air outlet of the compressor and the first end of the condenser;

the controlling the conduct of the cooling loop further comprises:

controlling the opening of the third stop valve.

12. The method according to claim 8, wherein the thermal management system further comprises a radiator configured to dissipate heat for the condenser;

the method further comprises:

controlling the starting of the condenser when the current temperature is greater than or equal to the first temperature threshold.

13. An electrical structure comprising the thermal management system according to claim 1 and a battery.

* * * * *